United States Patent Office 3,045,651
Patented July 24, 1962

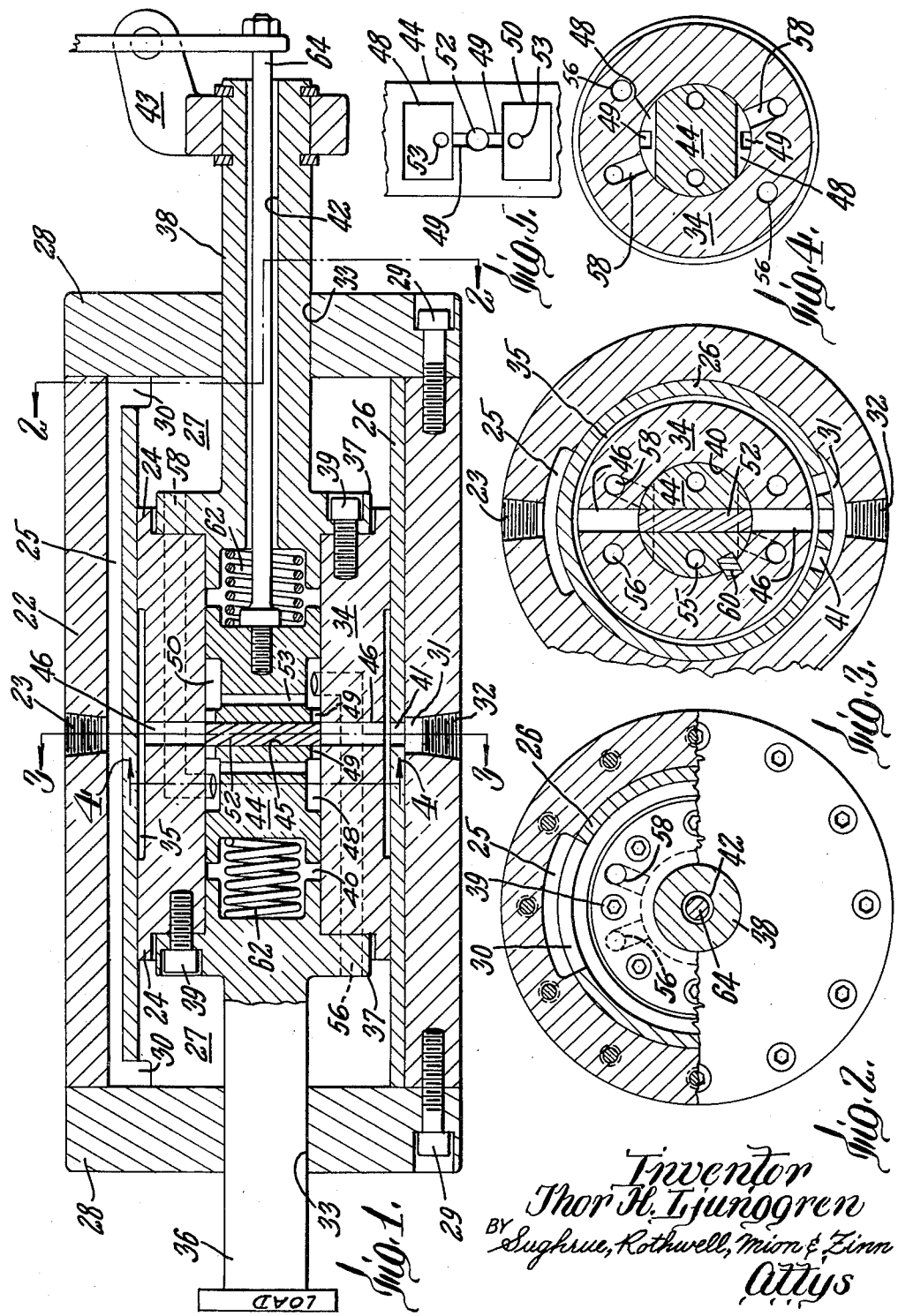

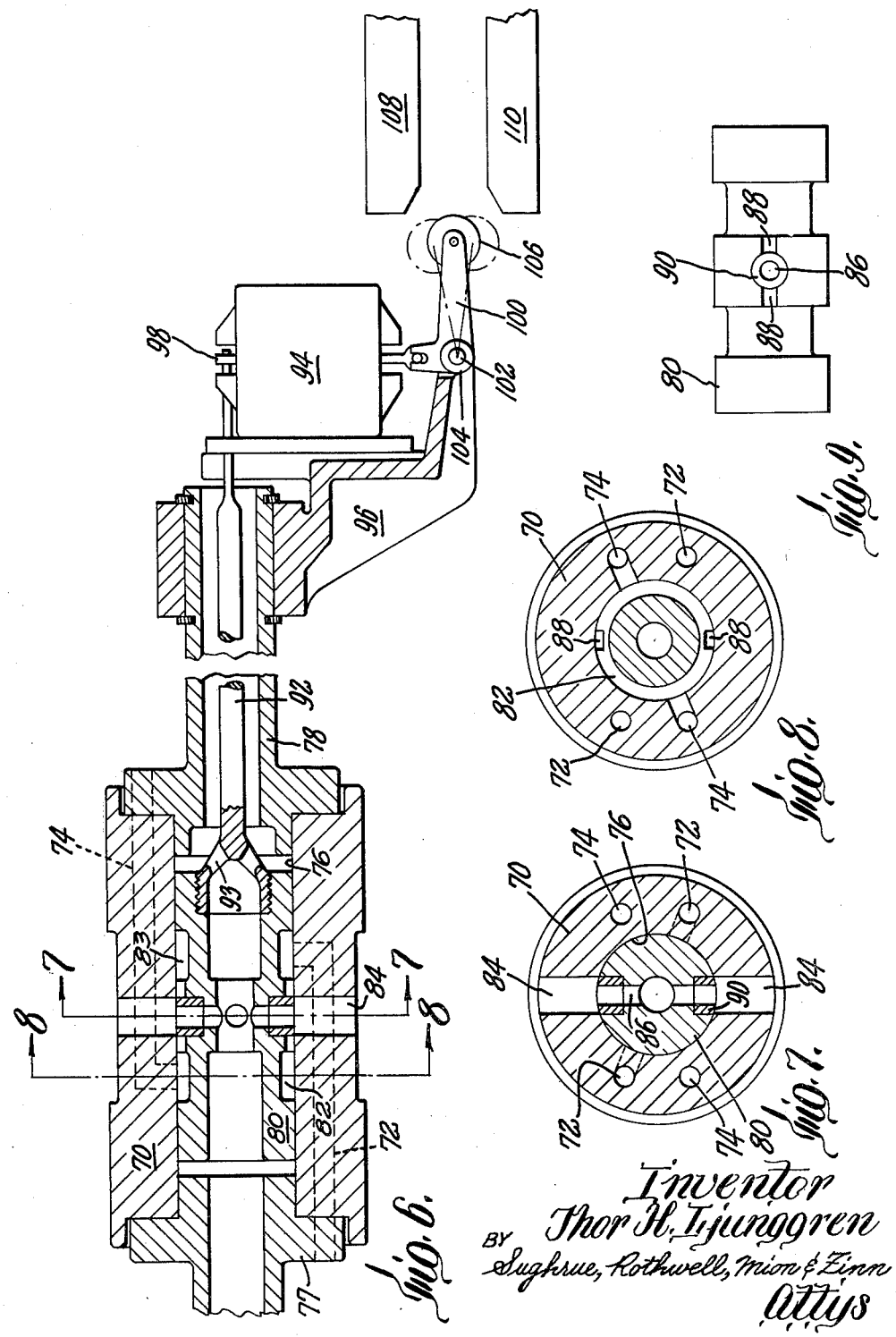

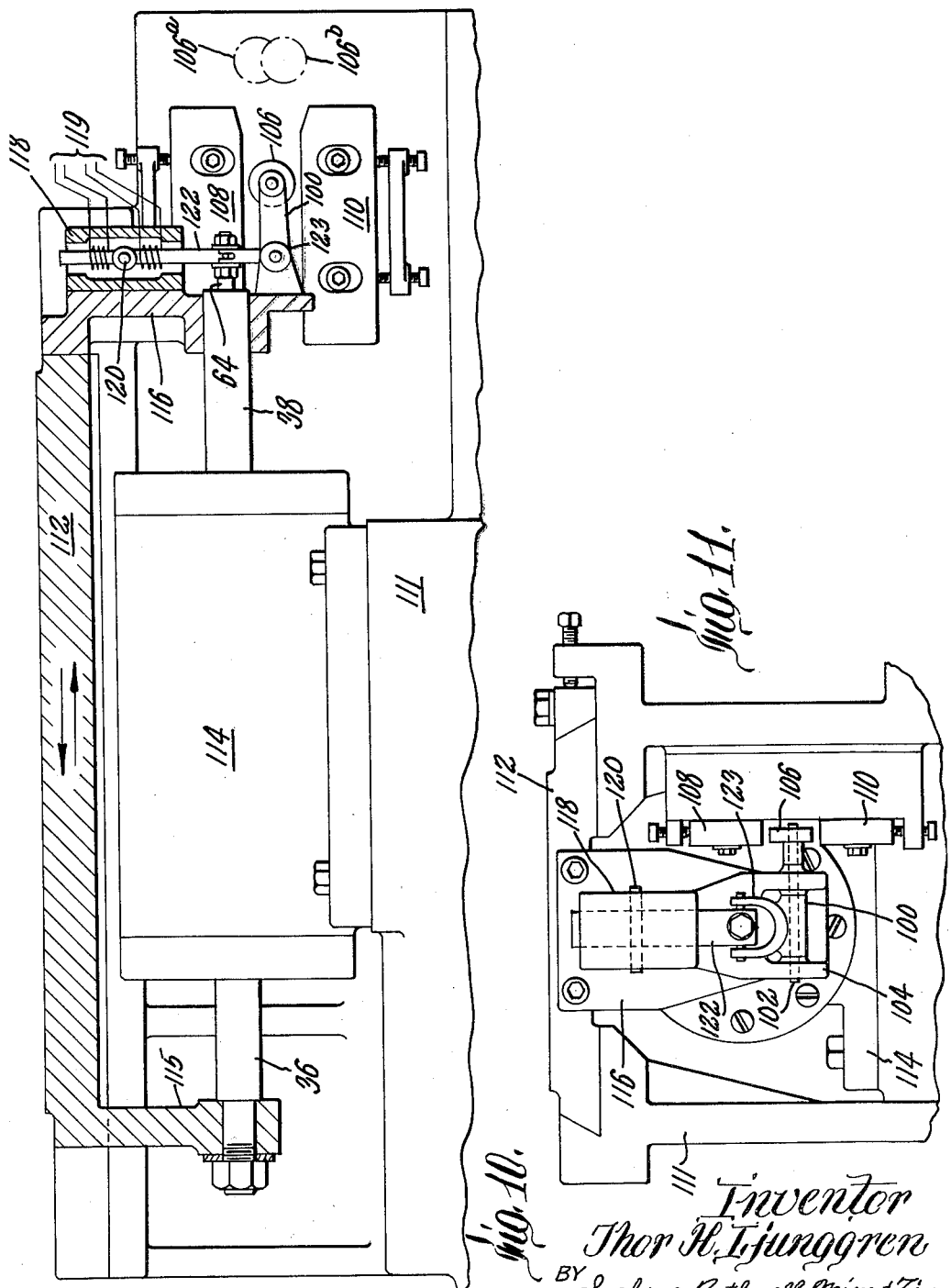

3,045,651
SERVO MOTOR
Thor H. Ljunggren, R.F.D. 1, Perkinsville, Vt., assignor of twenty-five percent to Sughrue, Rothwell, Mion & Zinn, Washington, D.C., a partnership
Filed June 3, 1960, Ser. No. 33,705
16 Claims. (Cl. 121—41)

This invention relates to servo motors of the expandable chamber type and control valve means suitable for a high performance system, such a system being characterized by fast response to input control signals, high sensitivity in answer to an error signal derived from one or other kind of feed back, while being stable over the widest possible range and having freedom from surge inducing sources that may cause undesired vagrant oscillatory phenomena. To meet the criterion for such a system, possible points of leakage to the ambient must be few, and internal leakage, either unavoidable or purposefully planned, should be laminar. Also, the structure's members should be few and simple, however, made to a high degree of exactness giving assurance of longevity without introducing undue high manufacturing cost.

It is an object of this invention, therefore, to provide a device of this class where the servo motor proper, its control valve and command signal generator are combined in a unitary structure.

Another object of the invention is to provide structural elements that are rugged and may be manufactured to today's highest requirements on precision and still to a reasonable cost.

Still another object is to provide such said structural element of simple design having a minimum of wear inducing parts, however, the number of parts still being ample functionally.

It is proposed that these objects be obtained by a novel structure where, in an expandable chamber motor of the linear movement type, two expansible chambers on opposite sides of a piston within a cylinder are constantly in open communication with a source of pressurized fluid medium while, alternately and selectively, the chambers may be connected to an exhaust line through a three-way valve located in the interior of the motor's piston and coaxial thereto, the valve having a neutral position when no flow occurs. The valve may selectively be urged to move away from this neutral position by command from a control device transmitted through a control rod mounted in a piston rod and extending outside the motor, thereby enabling the valve, upon appropriate command, to selectively connect a chosen expansible chamber to exhaust causing movement of the piston.

Further objects and features of the invention will be apparent from the following description of a preferred embodiment with modifications and an example of adaptation to a machine all taken in reference to the accompanying drawings in which:

FIG. 1 is a side sectional view taken in a plane through the longitudinal axis of a device embodying the present invention;

FIG. 2 is a sectional view normal to the longitudinal axis taken along line 2—2 of FIG. 1;

FIG. 3 is another sectional view taken in like manner along line 3—3 of FIG. 1;

FIG. 4 is still another such sectional view taken along line 4—4 of FIG. 1;

FIG. 5 is a top plan view showing in detail a portion of the innermost element of FIG. 4;

FIG. 6 is a side sectional view in a manner of FIG. 1 showing a modified embodiment of the invention;

FIG. 7 is a sectional view taken along line 7—7 of FIG. 6;

FIG. 8 is another sectional view taken along line 8—8 of FIG. 6;

FIG. 9 is a top plan view of the innermost element in FIGS. 7 and 8;

FIG. 10 is a somewhat schematized side elevational view of a machine incorporating the invention;

FIG. 11 is a right end elevation view of said machine in FIG. 10.

The present invention is shown in a preferred embodiment as an expandable chamber motor in combination with mechanism for controlling sense of direction and velocity of said motor all contained in a unitary structure as shown in FIG. 1. The motor has a relative stationary housing 22 provided with a cylindrical bore running from end to end of the housing along a longitudinal axis and inside this bore is pressed a sleeve 26 having the same length as the housing. The interior surface of the sleeve forms a wall for a cylinder 27 which is closed at both ends by caps 28—28 rigidly secured to the housing 22 by conventional means, e.g. several screws 29. The housing 22 is further provided with suitable conduits by means of which a fluid medium under pressure may be supplied to each end of the cylinder 27. An inlet opening 23 may have an appropriate supply line from a source of the pressurized fluid medium attached thereto. The inner portion of inlet opening 23 is in fluid communication with a duct 25 running the length of the housing 22 outside the sleeve 26. The ends of sleeve 26 are cutout at 30—30 aligned with the duct 25 (see FIGS. 2 and 3) to constitute a desired permanent line of communication between the source of the pressurized fluid medium and both ends of the cylinder 27. An outlet opening 32 is spaced equidistant from the ends of the housing 22 where the sleeve 26 at this point is perforated by at least one hole 41 to bring a scallop-shaped cavity 31 in communication with the interior of sleeve 26 and the outlet 32 (FIG. 3).

In the cylinder 27 is slidably mounted a piston 34 provided at each end with piston rods 36 and 38 respectively, these piston rods being slidably mounted in central bores 33—33 of the caps 28—28, and thus the cylinder 27 is divided to form a left chamber and right chamber between the ends of the piston 34 and the caps 28—28; each chamber being in continuous open communication with the source of a pressurized fluid medium as described above.

On the exterior and at each end of the piston 34 is an annular land 24 forming a substantially fluid tight sliding fit with the interior of sleeve 26; and intermediate between these lands 24—24, the piston has a reduced diameter portion to form an annular cavity 35. The longitudinal extension of the cavity 35 equals the desired length of stroke of the piston plus the diameter of the hole 41. The piston has a central bore 40 throughout its length and the outer end portions thereof afford piloting means for piston rods 36—38, which rods by means of integral flanged portions 37—37 and in conventional manner, e.g. several screws 39 are attached to the piston 34 to make one rigid assembly. To the extreme free end of the piston rod 36 is connected a desired load, and at its extreme free end the piston rod 38 has secured thereto a suitable control device 43 in communication with the interior of the piston 34 through a central conduit 42 in a manner and for a purpose that will be explained presently.

The central portion of bore 40 intermediate of the piloting portions forms a substantially fluid tight support for a valve slide member 44 slideably positioned therein. Equidistant from the ends of the cavity 35 on the exterior of piston 34 are drilled at least one pair of holes 46—46, ending in the bore 40, and located diametrically opposite. The valve slide member 44 is of general cylindrical shape provided with at least two pairs of flattened portions located diametrically opposite each other laying shallow below the perimeter of the slide and spaced in longitudinal direction equidistantly from a median axis normal to the longitudinal axis of the slide, and intermediately between said transverse axis and the ends of the slide, thus forming pairs of segmental cavities 48—50 between the slide 44 and the bore 40 (FIGS. 4 and 5). Through said transverse and median axis is drilled a hole 45 and on the perimeter of the slide are formed channels 49—49 of predetermined cross section, these channels running from the said flattened portions towards the center of the hole 45. A rod 52 is press fitted in the hole 45 (FIG. 3), this rod having its extremes flush with the exterior of the slide resulting in a substantially fluid tight fit against the bore 40. Holes 53—53 may be drilled between the flattened surfaces for the purpose of equalizing pressure on the slide and for like reason holes 55—55 may be drilled from end to end of slide 44 (FIG. 3). The rod 52 in position forms a barrier across the channels 49—49 and by choosing the diameter of the rod at least equal to the diameter of holes 46—46 communication therebetween and cavities 48 and 50 respectively will be effectively barred when the slide is in a position where rod 52 is in register with holes 46—46. This position may be called the normal or neutral position of the valve slide, i.e. substantially zero flow through the system with fluid communication between both expansible chambers and the exhaust 32 effectively blocked.

The piston 34 is provided with at least one pair of conduits (FIGS. 1 and 4) forming means of communication from each of the expandable chambers to the bore 40, arranged in the following manner: From the left chamber, a conduit 56 leads to a position to the right of the hole 46 ending in bore 40 to register with one of the cavities 50; and from the right chamber, a conduit 58 leads to a position to the left of the hole 46 ending in bore 40 to register with one of the cavities 48. The correct and proper angular position of the valve slide 44, i.e. with axes of hole 46 and rod 52 co-linear may be maintained by means of a key 60 (FIG. 3). Between the end faces of the slide 44 and the inner faces of rods 36 and 38 respectively, springs 62—62 may be positioned to urge the slide to its neutral position. The center of the right end face of the valve slide 34 is rigidly secured by a threaded connection to a connecting rod 64 extending through the conduit 42 where the rod's other extreme is, by suitable means, coupled to a member of a control device 43.

A modification of the above-described embodiment is shown in FIGS. 6–9 inclusive and because this modification with one slight exception is directed to the piston and valve slide means, the housing 22 and thereto adjunct details is not included. The exception is that the outlet 32 now is omitted both structurally and functionally. In other words, the expansible chamber motor housing of the FIGS. 6–9 modification does not have a fluid pressure outlet in the side of the cylinder wall because the outlet may be through a hollow piston rod. In FIG. 6 is shown a sectional view of a piston 70 in a general way corresponding to the before described piston 34. The piston 70 has conduits 72 and 74 leading from the end faces of the piston to a central bore 76 therein. The outer portions of this bore afford piloting means for piston rods 77 and 78 and the intermediate portion of the bore 76 serves as a substantially fluid tight support for a tubular valve slide 80 slidably fitted therein. The valve slide 80 has two exterior portions of reduced diameter spaced intermediate between the ends and equidistant from a plane normal to the longitudinal axis of the slide and halfway between its ends. Said reduced portions limited outwardly by the bore 76 form two annular cavities 82 and 83.

In correspondence to the earlier described structure, the conduit 72 leads from the said left chamber to the bore 76 to register with the right cavity 83; and the conduit 74 leads from the said right chamber to the bore 76 to register with the left cavity 82; thereby forming desired lines of continuous open communication between the said expandable chambers of the fluid motor and said cavities 82 and 83.

Equidistant from the ends of the piston 70 are drilled at least one pair of holes 84—84, being located diametrically opposite in a plane normal to the piston's axis. In the absence of the outlet 32, the size of the extension of the reduced diameter portion 85 on the outside of the piston is not a factor in establishing the stroke of the piston, and is not strictly necessary from a functional standpoint.

In the valve slide 80 are drilled at least one pair of holes 86—86; these holes being located diametrically opposite each other in the median plane with their centers intersecting the axis of the slide. On the perimeter of the slide 80 are formed channels 88—88 of predetermined cross section, these channels running from cavities 82 and 83 toward the center of the hole 86 (FIG. 9). The outer portion of this hole is enlarged to the same diameter as the hole 84 and into this portion is press fitted an annular bushing 90 with its outer extreme flush with the perimeter of the slide 80, forming a substantially fluid tight fit against the bore 76. The bushing 90 forms a barrier between the cavity 82 on one side and the cavity 83 on the other side. With the slide in its normal or neutral position, communication from the cavities 82 and 83 and the interior of the slide 80 will be effectively barred.

In the earlier described embodiment in reference to FIGS. 1 to 5 inclusive, the exhaust line for the pressurized medium was directed outwardly through the piston 34 and housing 22. In the now described embodiment, the line of exhaust is directed towards the interior of the valve slide to continue through central holes in the piston rods 77 and 78. In such cases, when an expendable fluid medium is used, the exhaust may be discharged directly to the atmosphere; in other cases, provision may be made at the outer extremes of the piston rods to provide means to return the fluid in closed conduits to a tank or the like.

To the right end of the slide 80 is rigidly secured a connecting rod 92 extending out through the hollow interior of the piston rod 78 where the connecting rod's outer extreme may be coupled to a control device 94. The inner portion of the connecting rod 92 is provided with suitable apertures 93 to permit free passage of fluid between the interiors of slide 80 and rod 78.

The control device 94 is here illustrated and described as a torque motor rigidly secured to a bracket 96 which in its turn is rigidly supported on the piston rod 78. The connecting rod 92 is coupled to one end of the torque motor's armature 98; to the other end of the armature 98 is coupled one arm of a bell crank 100 which is pivoted on a shaft 102 journaled in bearing means 104 depending from the bracket 96. On the other end of bell crank arm 100, a cam roller 106 is supported. In proximity to an intended path of the cam roller there is shown fragmentally a couple of cams 108 and 110 which may be adjustably attached to an extension of housing 22 (not shown). Against these cams, the roller 106 is constrained to ride during some given predetermined conditions, thereby restraining the movements of the bell crank 100 in a manner to be presently described.

In FIGS. 10 and 11 there is illustrated an adaption of the invention to a simple machine having a base 111 whereon in a dovetail slide a table platen 112 is supported to be moved in a reciprocatory rectilinear path according to a predetermined program of velocity and variations thereof, and sequence and timing of such variations. On the base 111 is further rigidly secured a fluid motor 114 of the kind described in reference to FIG. 1 also referred to in the description that follows. The piston rod 36 is shown as rigidly secured to a lug 115 depending from the table platen 112. When the table 112 is caused to move towards the left, this will be termed "the advancing stroke" and when the movement is towards the right, the term "retracting stroke" will be used. A bracket 116 (analogous to the bracket 96 of FIG. 6) is rigidly attached to the table 112 at its upper end while a hub portion of the bracket is supported on the piston rod 38. Rigidly mounted on the bracket 116 is a torque motor 118 from the coils of which lead wires 119 may be connected to any suitable, remotely located, programming device (not shown). An armature 122 of the torque motor with its fulcrum at 120 is coupled to the connecting rod 64 and on a downward extension of the armature is a clevis 123 affecting a coupling to an arm of a bell crank 100 (compare also FIG. 6). This bell crank as described before on a shaft journaled in bearing integral with the bracket and the other bell crank arm carries the cam roller 106. The cams 108 and 110 are shown in FIG. 10 adjustably supported on the base 111.

In FIG. 10, the table 112 is shown at the halfway point of its path; the coils of the torque motor 118 are de-energized, permitting the built-in spring factor to constrain the armature 122 to its neutral position halfway between the motor's pole pieces. (The springs 62—62 are normally omitted as superfluous when a torque motor is adapted as signal generator.) Referring back to FIG. 1, with the armature in neutral position, the valve slide 44 will then be in its neutral position, i.e. the rod 52 is in register with the holes 46, blocking flow from either cavities 48 and 50 with the result that the piston 34 is held in an unmoving state by the now built up equalized pressure in the left and right chambers of the fluid motor. If now the torque motor is energized and polarized in a manner that the armature 122 will turn clockwise thereby displacing the valve slide 44 away from its neutral position towards left which will permit the pressurized medium in the left chamber to pass through the conduit 56, the cavity 50, the hole 46 and by way of cavity 35, the hole 41 and the outlet 32 to exhaust causing a pressure drop in the left chamber, making the pressure in the right chamber dominant which will propel the piston 34 towards left. Should the torque motor be polarized in a manner that the armature 122 will turn counter clockwise displacing the valve slide towards the right, the fluid flow will now be from the right chamber through the conduit 58, the cavity 48, channel 49, hole 46, cavity 35, hole 41 to exhaust outlet 32. Thus the pressure drop will now occur in the right chamber and the piston will be propelled towards right.

In the herein discussed adaptation, the armature 122, depending on the kind of command signal received, will move to one of three positions: (1) neutral, (2) clockwise maximum and (3) counter clockwise maximum. The neutral position will place the cam roller 106 in the position shown in full drawn lines in FIG. 10, and the clockwise movement of the armature will urge the roller upwards towards the position shown in phantom lines at 106a; while a counter clockwise movement of the armature will urge the roller downwards towards the position shown in phantom lines at 106b. These positions in phantom lines are indicative of the maximum displacement from its neutral position of the valve slide 44 corresponding to maximum speed of the piston 34 permitted by design parameters at hand. Should a lesser rate of speed be required during whole or part of the stroke, cam means 108 and 110 may coact with roller 106 to override the torque motor and restrain the movement of the valve slide 44 to a lesser amount than requested by the command signal to the torque motor. By adjusting such cam means in more or less proximity to a projected path of the cam roller 106 in neutral position and normal to said path, a desired stroke of lesser velocity may be achieved. The extension of the cams may be over the total stroke length or only part or parts thereof and the cam positions may vary along the path. Assume now that the total stroke of the table platen 112 is going to be utilized with maximum stroke velocity during the first and last part of both the advance and retracting strokes and that during the intermediate stroke portion a lesser speed is required. The cam 108 is then, as shown in FIG. 10, located longitudinally so as to be contacted by cam roller during the intermediate part of the advance stroke and in appropriate proximity of the path of the cam roller 106 thereby restraining the movement of the slide valve 44 at a point commensurate with the desired table lesser platen velocity. In analogous manner, the cam 110 may be located longitudinally and adjusted transversally to control the velocity of the table platen during part of the retractive stroke. It is clear that the cams 108 and 110, being entirely independent of each other, may therefore be utilized in sundry ways, e.g. selecting the control of different portions of the advance stroke from the retractive stroke and different velocity choice between the stroke portions to suit the requirements of specific cycling sequences.

It is believed that the operation of the servo motor of this invention will be evident from the foregoing, however, for the sake of further clarity and understanding a full description of the operation of the servo motor and immediately governing controls is as follows:

In operation, the motor is constantly supplied with a pressurized fluid medium from a suitable source (not shown) through inlet 23. This pressurized fluid medium flows to the left-hand expansible chamber 27 as viewed in FIG. 1 through duct 25 and cut out opening 30 and from there through conduit 56 to cavity 50, while simultaneously the pressurized fluid medium flows to the right-hand expansible chamber 27 through the corresponding portion of duct 25 and corresponding cut out opening 30 and further passes through conduit 58 to cavity 48. Cavities 48 and 50 are formed between the central bore 40 of piston 34 and the outer portion of valve slide 44 as described above. The longitudinal extension of the cavities or pockets are such that in any position of the valve slide they will not obstruct flow through conduits 56 and 58. In a central land of the valve slide 44, a rod 52 is provided which forms an effective barrier preventing direct communication between pockets 48 and 50 by blocking channels 49—49. An exhaust line is provided consisting of holes 46, cavities 35, hole 41, cavity 31 and outlet 32 where connection may be made for a suitable return conduit to a pump, tank or the like.

With the valve slide in its normal or neutral position, the rod 50 is in register with the holes 46, as shown in FIGURE 1, it will be evident that no fluid flow occurs through the system and, consequently, the piston rod 36 and load attached thereto will be in an arrested status.

Consider now, that the valve slide 44 is displaced toward the left as viewed in FIG. 1 by rod 64 actuated by the control signal device 43. By such displacement, rod 52 uncovers holes 46 and establishes fluid communication between pocket 50 and exhaust. The flow from the pocket 48 to the exhaust line is still blocked while the pressurized medium is continually supplied. This condition will cause an unbalance of pressure and the piston will thereby be propelled toward the left because the pressure drop will occur in the left-hand, now the leading, chamber and the sustained pressure will be in the right-hand, now the lagging chamber.

It is also clear that when the valve slide 44 is displaced toward the right as viewed in FIG. 1, the piston rod 36 will likewise be propelled toward the right and the right-hand chamber now becomes the leading and the left-hand chamber now becomes the lagging chamber.

The mode of operation of the FIG. 6 embodiment is quite similar. The modification being that bushing 90 is substituted for rod 52 and the exhaust is directed through the interior of the valve slide 80 and piston rod 77 and 78 to atmosphere or the like.

The valve slide is actuated by a rod 64 in the FIG. 1 embodiment (or rod 92 in the FIG. 6 embodiment) and this rod is connected to a control signal device. The control signal device may the torque motor such as shown in detail in FIG. 10. When no unbalancing potential is applied to the torque motor the armature 122 will be in a position of repose as shown in FIG. 10 and this position is adjusted to correspond to the normal or neutral position of the valve slide and thus the arrested position of the load such as worktable 112. If a potential is impressed and the coils of the torque motor are polarized in a manner to turn the armature clockwise about its fulcrum 120 this will displace connecting rod 64 and thereby valve slide 44 toward the left with the result that piston 34 and worktable 112 are propelled in the same direction. Likewise, if the motor coils are polarized in such a manner that the armature turns counterclockwise the valve slide and the load will be displaced toward the right and the piston will also move in this direction.

It is sometimes desirable to supplement the torque motor with mechanical control means for more rugged use and dependability as well as for velocity control. In this connection mechanical control is shown in FIGS. 6 and 10 and the torque motor 118 functions as a primary or first control means for controlling the valve slide and the servo motor with the sole function of establishing the sense of motion and the maximum desired velocity. The second control means for governing the velocity, i.e., acceleration or deceleration, is provided independent from the first means and at cycle command. This second control means consists of cam follower 106 linked to armature 122 and compelled to follow its movements unless constrained by cams 108 and 110.

If the piston of the servo motor is near its extreme right-hand position, the cam follower 106 will be in the position shown in the phantom line 106a in FIG. 10 if the torque motor has received a command to turn clockwise. Then the piston with rod 38 is moving toward the left at maximum velocity. In the path of cam follower 106 is the stationary cam 108 which will be contacted by the follower as it together with the piston rod 38 moves to the left. This cam may be adjusted in such a manner that the follower 106 will be restrained to follow a path closer to the position of repose than the extreme position shown in location 106a and by overriding the torque motor 118 will turn its armature 122 counterclockwise a fraction of the initial clockwise movement. This action will cause valve slide 44 to move back a corresponding fraction of its initial movement thereby chocking the exhaust passage with the result that the velocity of piston 34 will be decreased and the piston will decelerate to a desired lower speed controlled by the follower 106 in contact with cam 108. Up to the end of the left-hand stroke it can be assumed that the same relative position between follower 106 and cam 108 prevails and, eventually, a new command constrains the torque motor to make a counterclockwise stroke thereby reversing the direction of motion of the piston. As there is another cam 110 opposite cam 108, the follower will be restrained thereby and during the rightward stroke the piston will travel at a speed lower than maximum until towards the last part of the stroke the cam follower will run off of cam 108 and now being unrestrained will take its maximum position, 106b, thereby accelerating to and finishing the stroke at maximum speed.

Above has been described a preferred embodiment plus a modification and an adaptation illustrating a novel structure flexible enough to meet diverse and various modifications and adaptations, physically simple and rugged enough to be suited for long, dependable service without any decaying effect on its functional aspects, characterized by and featuring a fluid motor employing unidirectional flow; this motor being controlled both in respect to sense of direction of movement and velocity by a single three-way valve serving the motor through exceptionally short conduits and wherein a primary control device governing the valve is mounted (fixedly) on the motor's movable member; and means independent of said primary control device adaptable to override the primary control signal to modify the function of the valve in accordance with a pre-selected program sequence.

It is understood that certain features and sub-combinations are of utility and may be employed without reference to other features and sub-combinations. This is contemplated by and within the scope of the claims and it is obvious that various changes may be made in detail within the scope of the claims without departing from the spirit of the invention.

Having thus disclosed and described my invention, I claim:

1. An expansible chamber servo motor of the linear movement type comprising in combination; a motor cylinder having closed ends, a fluid pressure inlet in the side wall of said cylinder, means establishing fluid communication between the fluid pressure inlet and the ends of said cylinder through said cylinder wall, a hollow reciprocating piston including an internal bore slidably mounted within said cylinder, piston rods rigidly attached to said piston and extending through the end walls of said cylinder, at least one of said piston rods being hollow, means establishing fluid communication through said piston from the opposite ends thereof to the internal bore therein, further means establishing fluid communication from the internal bore of said piston to exhaust, a three-way valve slide slidably mounted in the bore of said piston, said valve slide in one position adapted to block fluid communication between either end of said piston and exhaust and adapted when selectively moved to the other positions to allow a selected end of said piston fluid communication to said exhaust while blocking similar fluid communication from the other end of said piston whereby said piston will move in accordance with the position of said valve slide therein, a valve slide actuating rod rigidly secured to said valve slide and extending through said hollow piston rod to a position outside of said cylinder, a signal generator responsive to a signal for controlling said valve slide actuating rod, and cam means cooperating with said valve slide control rod during movement of said piston and said valve slide to override the signal generator and control the velocity of said piston.

2. A servo motor as defined in claim 1 wherein said fluid pressure exhaust is through a passage in said piston and a corresponding passage in the wall of said cylinder.

3. A servo motor as defined in claim 1 wherein said fluid pressure exhaust is through said hollow piston rod and a hollow portion of said valve.

4. A servo motor system comprising; a cylinder having end walls, a piston mounted for sliding movement within said cylinder intermediate said end walls, the piston having an axially disposed cavity therein and being provided at each end with reduced diameter portions, these reduced diameter portions forming piston rods extending through the end walls to the exterior of the cylinder, at least one of the piston rods being of tubular configuration, the piston rods and cylinder together forming expansible chamber portions of equal cross sectional area at each end of the cylinder, means to constantly supply said expansible chambers with a pressurized fluid medium, a pressurized fluid balanced three-way valve slide mounted for sliding movement along the piston axis in the cavity in the piston, said three-way valve having a fluid passage blocking portion with a single longitudinal critical dimension to form the sole and ultimate means for governing the sense of direction and velocity of the fluid motor piston, a control signal means fixedly mounted outside the cylinder on one of the piston rods, and a control rod extending through the tubular piston rod and connecting the valve slide to the control signal means for controlling the servo motor.

5. A servo motor system as defined in claim 4 wherein said fluid pressure balanced three-way slide valve is constructed with fluid sealing lands at each extreme and at a central position between the extremes thereby forming with the cavity in the piston pockets intermediate the central land and the extreme lands, said pockets together with radial communication ducts and longitudinal communication ducts from end to end of the valve slide constituting the means which assures the equalization of radial and longitudinal flow forces acting on the valve slide, thus attaining a balanced valve slide structure, conduits through the piston connecting the pockets at all times with the expansible chambers in each end of the cylinder, the conduits arranged and connected in such a manner that a pocket on one side of the center of the valve slide communicates with the expansible chamber on the other side of the center, and exhaust passage blocked by the central land of the valve slide when the valve slide is in the neutral position.

6. A servo motor system as defined in claim 5 wherein said exhaust passage is directed through the center of the valve slide and the piston rods.

7. A servo motor system as defined in claim 6 wherein the position of the control signal means in repose corresponds to a normal and neutral position of the valve slide and wherein the control signal means is adapted to selectively urge the valve slide away from its normal position in a predetermined direction to form an open communication between the exhaust conduit and one of the expansible chambers whereby a resultant pressure drop in this chamber and the sustained pressure in the opposite expansible chamber cause the piston to be propelled in the same direction as the motion of the valve slide.

8. A servo motor system as defined in claim 7 wherein said control signal means is a first control means governing the sense of the valve slide motion at a maximum velocity and further comprising a second control signal means independent of the first control means and adapted to modify the established velocity to any desired lower velocity.

9. A servo motor system as defined in claim 8 wherein said second signal control means comprises a cam follower fixedly supported on the piston rod to participate in a longitudinal motion of the piston rod; the cam follower hinged at one degree of freedom in a plane parallel to the piston rod's axis and adjustable cam means in the same plane fixedly mounted relative to the cylinder at a predetermined location in the path of the cam follower.

10. A servo motor system as defined in claim 9 further comprising means to connect the hinged cam follower to the control rod for the valve slide in a manner such that when the valve slide is in normal position the cam follower is positioned on a median line and when the valve is urged away from its normal position in one direction the cam follower is biased from the median line, and when the valve is urged in the opposite direction the cam follower is biased in the opposite direction, the amount of bias being limited in regard to the magnitude of a preselected distance between the median line and the cam means corresponding to a desired velocity value and in regard to timing by a preselected location of the cam means along the path of the cam follower.

11. A servo motor comprising;
(a) an expansible chamber motor including a cylinder and a reciprocating piston therein,
(b) means for admitting a pressurized fluid simultaneously to both ends of the expansible chamber motor,
(c) means within the cylinder establishing fluid communication between the pressurized fluid in both ends of the expansible chamber motor,
(d) means defining an exhaust port positioned at a central portion of the piston,
(e) a three-way fluid pressure balanced pilot valve slidably mounted within the reciprocating piston,
(f) a single land of critical longitudinal dimension on the pilot valve and the dimension being sufficient to just block the exhaust port when the valve is in neutral position,
(g) the land and exhaust port being of a configuration and dimension such that when the land is moved relative to the exhaust port it uncovers the port an amount linearly proportional to the amount of movement, thus movement of the valve selectively blocks fluid communication from one end of the expansible chamber motor while allowing fluid communication from the other end of the expansible chamber motor to the exhaust port,
(h) means for admitting the pressurized fluid medium from each end of the expansible chamber motor to both sides of the land of the pilot valve to pressure balance the same,
(i) and control means external to said cylinder and piston operable through said piston to control said valve.

12. An expansible chamber servo motor of the linear movement type comprising in combination;
(a) a stationary cylinder having closed ends,
(b) a fluid pressure inlet passage in the central portion of the side wall of the cylinder,
(c) a cylinder liner positioned within the cylinder,
(d) means for establishing fluid communication between the inlet and the ends of the cylinder liner through a passage between the outside of the cylinder liner and a longitudinal cut out portion in the wall of the cylinder, so that fluid pressure admitted to the inlet will be directed at equal pressure to both ends of the interior of the closed cylinder forming two expansible chambers,
(e) a hollow reciprocating piston including an interior bore, the piston being slidably mounted within the cylinder liner,
(f) a pair of piston rods rigidly secured to each end of the piston, the piston rods extending outwardly through the walls of the cylinder, one of the piston rods being connected to a load device, and at least one of the piston rods being hollow,
(g) separate passage means establishing fluid communication between both ends of the piston, and therefore between both expansible chambers within the cylinder, and separate spaced points in the hollow bore of the piston,
(h) further exhaust port and passage means establishing fluid communication between the bore of the piston and an exhaust, the exhaust port opening into the bore at a position intermediate the separate points of termination of the separate passages which establish fluid communication between both ends of the cylinder and the hollow bore of the piston,
(i) a three-way slide valve slidably mounted in the hollow bore of the piston,
(j) an exhaust passage blocking projection on the three-way slide valve with a single longitudinal critical dimension for just barely blocking the exhaust port when the valve is in a neutral position with the fluid pressure exerting a pressure balancing force on each side of the projection to pressure balance the valve in neutral position, and movement of the valve slide to expose the exhaust port allowing fluid communication between one of the expansible chambers and exhaust,
(k) the exhaust port and the single longitudinal critical dimension on the valve projection being shaped such that any displacement from a neutral position will cause opening of the exhaust port in an amount directly proportional to the displacement,
(l) a control rod secured to the slide valve and extending through the hollow piston rod,
(m) and means for actuating the control rod to control movement of the piston and hence control the application of fluid pressure to cause movement of the piston and the connected load device.

13. A servo motor as defined in claim 12 wherein said control means includes a torque motor connected to said control rod and carried from the piston rod, the torque motor adapted to actuate the control rod upon receipt of a predetermined signal to control the direction of the piston, and further comprising a bell crank and cam follower connected to said torque motor and adapted to override the same, a pair of stationary cams adapted to cooperate with said cam follower upon movement of said piston for controlling of said control rod and overriding the control of the torque generator, hence controlling the velocity of said piston.

14. A servo motor comprising;
 (a) a stationary cylinder including end walls,
 (b) means for admitting fluid pressure to said cylinder equally and simultaneously at both ends thereof,
 (c) a piston including a hollow bore slidably mounted in said cylinder,
 (d) a piston rod rigidly connected to each end of said piston and extending outwardly therefrom through said cylinder end walls, at least one of the piston rods being hollow,
 (e) means defining a pair of entrance passageways connecting each end face of said piston with the hollow bore therein,
 (f) means defining an exhaust port in said piston bore,
 (g) means defining an exhaust passage through the piston and cylinder and originating at the exhaust port,
 (h) each of said entrance passageways communicating with said bore on opposite sides of the exhaust port,
 (i) a fluid pressure balanced three-way valve slide slidably mounted in said bore,
 (j) bore contacting means on the valve containing a single critical longitudinal dimension normally blocking said exhaust passage from fluid communication with either of the entrance passageways to either of said expansible chambers at either end of said cylinder in a neutral position while any movement off of a neutral position will block one of said passages and allow the other of said passages from said expansible chamber communication with exhaust in an amount directly proportional to movement of the valve whereby the piston will move in the direction of the expansible chamber having the least pressure therein,
 (k) a control rod connected to said valve slide and adapted to actuate the same, said control rod extending through said hollow piston rod to a position outside of said cylinder,
 (l) and control means connected to said control rod for controlling said servo motor.

15. A servo motor as defined in claim 14 wherein said control means includes a torque motor the armature of which is connected to said control rod for controlling said servo motor in response to received signals, a cam follower lever also connected to said control rod, stationary cams positioned in the path of said cam follower during movements of said servo motor piston at certain positions of said control rod for overriding said torque motor to control said valve and hence the velocity of said servo motor.

16. A servo motor as defined in claim 15 further comprising adjustable mounting means for adjustably positioning said cams to control the velocity of said servo motor within a predetermined range.

References Cited in the file of this patent

UNITED STATES PATENTS

| | | |
|---|---|---|
| 2,445,343 | Tyra | July 20, 1948 |
| 2,579,028 | Baldwin | Dec. 18, 1951 |
| 2,813,519 | Persson et al. | Nov. 19, 1957 |
| 2,909,157 | Reis | Oct. 20, 1959 |
| 2,920,650 | Moog | Jan. 12, 1960 |

FOREIGN PATENTS

| | | |
|---|---|---|
| 1,029,754 | France | Mar. 11, 1953 |